United States Patent [19]
Kim

[11] Patent Number: 5,199,061
[45] Date of Patent: Mar. 30, 1993

[54] COMMUNICATION METHOD AND EQUIPMENT FOR FREEZE-FRAME VIDEO PHONE

[75] Inventor: Do Young Kim, Daejeon, Rep. of Korea

[73] Assignees: Electronics and Telecommunications Research Institute; Korea Telecommunication Authority, Rep. of Korea

[21] Appl. No.: 823,029

[22] Filed: Jan. 16, 1992

Related U.S. Application Data

[63] Continuation of Ser. No. 578,874, Sep. 6, 1990, abandoned.

[30] Foreign Application Priority Data

Sep. 6, 1989 [KR] Rep. of Korea ............... 1989-12897

[51] Int. Cl.[5] .......................................... H04M 11/00
[52] U.S. Cl. ...................................... 379/53; 379/97; 375/58; 371/5.5
[58] Field of Search ............ 379/53, 54, 96–98, 379/100; 375/34, 58, 121; 371/5.5

[56] References Cited

U.S. PATENT DOCUMENTS

| | | | |
|---|---|---|---|
| 4,236,248 | 11/1980 | Teramura et al. | 375/121 |
| 4,606,044 | 8/1986 | Kudo | 375/58 |
| 4,630,126 | 12/1986 | Kaku et al. | 375/34 |
| 4,710,925 | 12/1987 | Negi | 371/5.5 |
| 4,881,253 | 11/1989 | Takeuchi et al. | 379/54 |
| 4,939,767 | 7/1990 | Saito et al. | 379/53 |

FOREIGN PATENT DOCUMENTS 9003701 4/1990 World Int. Prop. O. ............ 379/93

OTHER PUBLICATIONS

J. W. Cronin, "Dial-Up Video Speeds Business Decisions", *Telephony*, vol. 210, No. 13, pp. 32, 33, Mar. 31, 1986.

Primary Examiner—James L. Dwyer
Assistant Examiner—Wing F. Chan
Attorney, Agent, or Firm—Blakely, Sokoloff, Taylor & Zafman

[57] ABSTRACT

The present invention comprises a system bus performing control and data transmission function among modules, a system control means, connected to the system bus, performing system control and interrupt control function, a modem and DTMF signal processing means, connected to the system bus, performing modulation and demodulation in the transmission rate of 9,600 bps, 4,800 bps, and 2,400 bps, and transmission and reception of DTMF signal, a standard telephone line connection means connecting the modem and DTMF signal processing means and a telephone to a standard telephone line, a program ROM, connected to the system bus, storing a program which controls communication through the modem and DTMF signal processing means, and a RAM, connected to the system bus, retaining current data.

1 Claim, 5 Drawing Sheets

COMMUNICATION METHOD AND EQUIPMENT FOR FREEZE-FRAME VIDEO PHONE

This is a continuation of application Ser. No. 578,874 filed Sep. 6, 1990, now abandoned.

BACKGROUND OF THE INVENTION

The present invention relates to a communication method and equipment for freeze-frame video phone over standard telephone line, which transmit and receive freeze-frame video data in appropriate interval between the users.

In TTC standard (Nippon TTC JJ-40.10, "Communication Method for Freeze-Frame Video Phone over Standard Telephone Line," 1988. 5. 13), a dual tone signal of 1633 Hz and 2006 Hz is used as transient signal from voice communication mode to video data communication mode. Video data are carried by a modulated carrier wave, approximate frequency of 1747 Hz, after amplitude and phase modulation. In other words, approximately 1747 pixels are sent in a second. In the conventional communication method, however, first, the system can easily malfunction by dual tones of whistling voice of human, second, it is hard to classify more than 64 grey levels per pixel as the video data are transmitted in analog method, amplitude and phase modulation.

SUMMARY OF THE INVENTION

Therefore, to solve the problems mentioned above, the present invention pertains to a communication method and equipment for a freeze-frame video phone over standard telephone line, which utilizes a modulation and demodulation method for facsimile equipment on standard telephone line, declared in CCITT recommendation V.29 and V.27 ter. and using data transmission rate of 9,600 bps, 4,800 bps, and 2,400 bps (bits per second). Also, the method and equipment transmits a freeze-frame video image much faster than the conventional method by effective control of the modulation and demodulation method.

To achieve the object mentioned above, the present invention consists of a system bus performing control and data transmission function among the modules, a system control means, connected to the system bus, performing system control and interrupt control function, a modem and DTMF(Dual Tone MultiFrequency) signal processing means, connected to the system bus, performing modulation and demodulation in the transmission rate of 9,600 bps, 4,800 bps, and 2,400 bps, and transmission and reception of DTMF signal, a standard telephone line connection means connecting the modem and DTMF signal processing means and a telephone to a standard telephone line, a program ROM, connected to the system bus, storing a program which controls communication through the modem and DTMF signal processing means, and a RAM, connected to the system bus, retaining current data.

The video data communication method of the present invention is divided into three steps, a first step which transmits a train of binary "0" signals, a second step which calculates error rate after the first step, and a third step which decelerates the transmission rate to 2,400 bps after communication with the receiver by using DTMF signal when the error rate reaches a specific level, and performs normal communication when the error rate does not reach the specific level.

DETAILED DESCRIPTION OF THE PREFERRED EMBODIMENT

Figure 1:
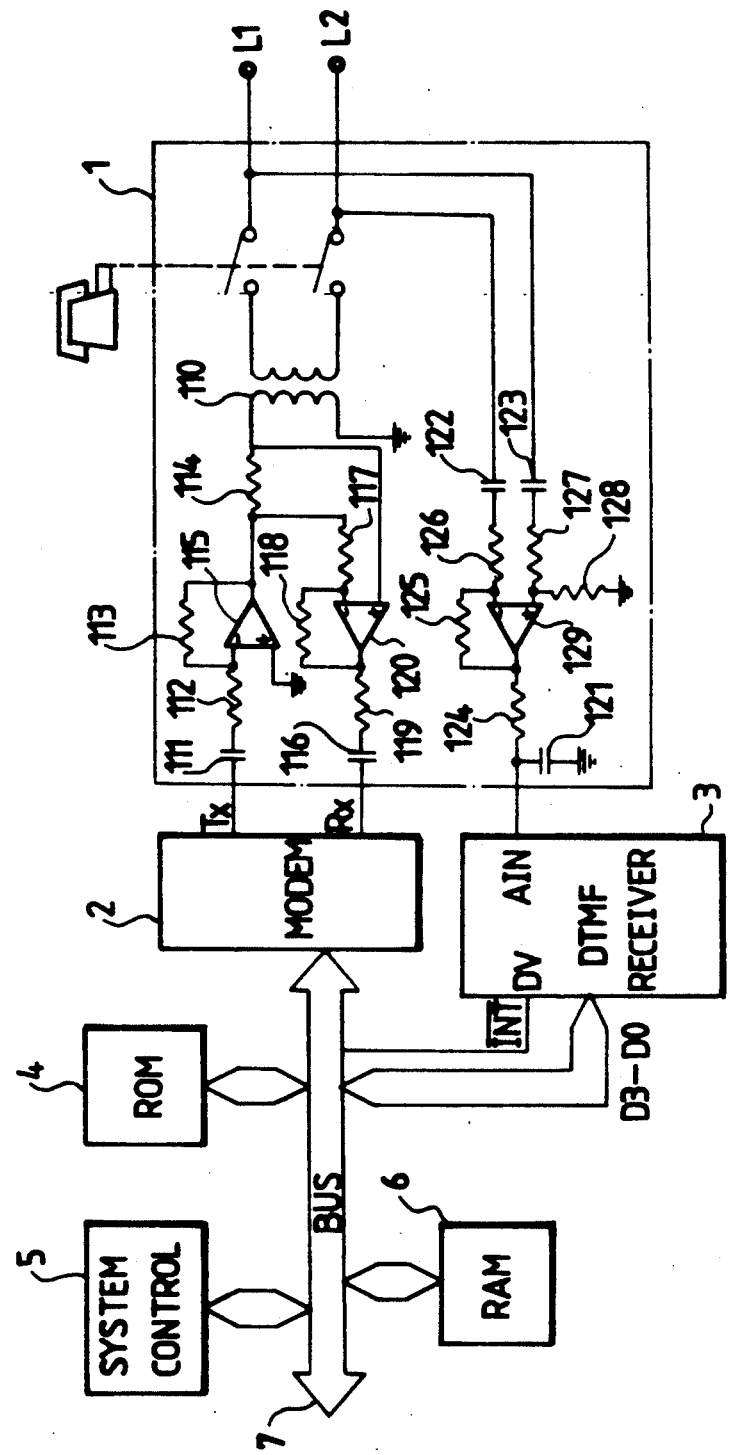
FIG. 1 is a block diagram of the present invention.

FIG. 1 is a block diagram of the present invention. The equipment includes a standard telephone line connection part 1, a modem 2, a DTMF receiver 3, a ROM 4, a system control part 5, a RAM 6, and a system bus 7.

The present invention consists of the system bus 7, the system control part 5, the ROM 4, the RAM 6, the modem 2, the DTMF receiver 3, and the standard telephone line connection part 1.

The system control part 5, comprising a CPU(Central Processing Unit) and peripheral circuits, such as a timer, DMA controler, and so on, connected to the address lines, data lines, control lines, and interrupt signal lines on the system bus, performs communication control function according to the ROM program.

The program in the ROM 4, sharing a part of memory map, controls an entire system operation and a DTMF generator in the modem 2 during reception, and executes control procedures.

The RAM, sharing a part of the memory map, is used for a temporary storage of current data used by the CPU in the system control part 5.

The modem 2, sharing an I/O part of the memory map, includes a modulation and demodulation function according to the CCITT recommendation V. 29 and V. 27 ter., and the DTMF generator, and operates in handshake mode according to a CPU control signal for an internal register and RTS. Also, it transmits and receives modulated or demodulated signal through the standard telephone line.

The DTMF receiver receives signal on the line through the standard telephone line connection part 1. In case a valid DTMF signal is detected, the DTMF receiver is connected to the CPU through 4-bit wide data line D0 through D3 after interrupt call to the CPU.

The standard telephone line connection control part 1, comprising a transformer 110 which satisfies the load of the terminal and an appropriate signal amplification means. At first, it connects the line to the telephone. But, in video data communication mode, it connects the line to the modem. The connection switch is controlled by the control line of the CPU and a relay.

The amplification means of the receiver includes a condenser 111, resistors 112, 113, and 114, and an operational amplifier 115. The amplification means of the transmitter includes a condenser 116, resistors 117, 118, and 119, and an operational amplifier 120.

Also, the amplification means for input signal to the DTMF receiver 3 has high input impedance, and regulates the AC input signal to a specific input level. The amplification means includes condensers 121, 122, and 123, resistors 124, 125, 126, 127, and 128, and an operational amplifier 129.

Figure 2:
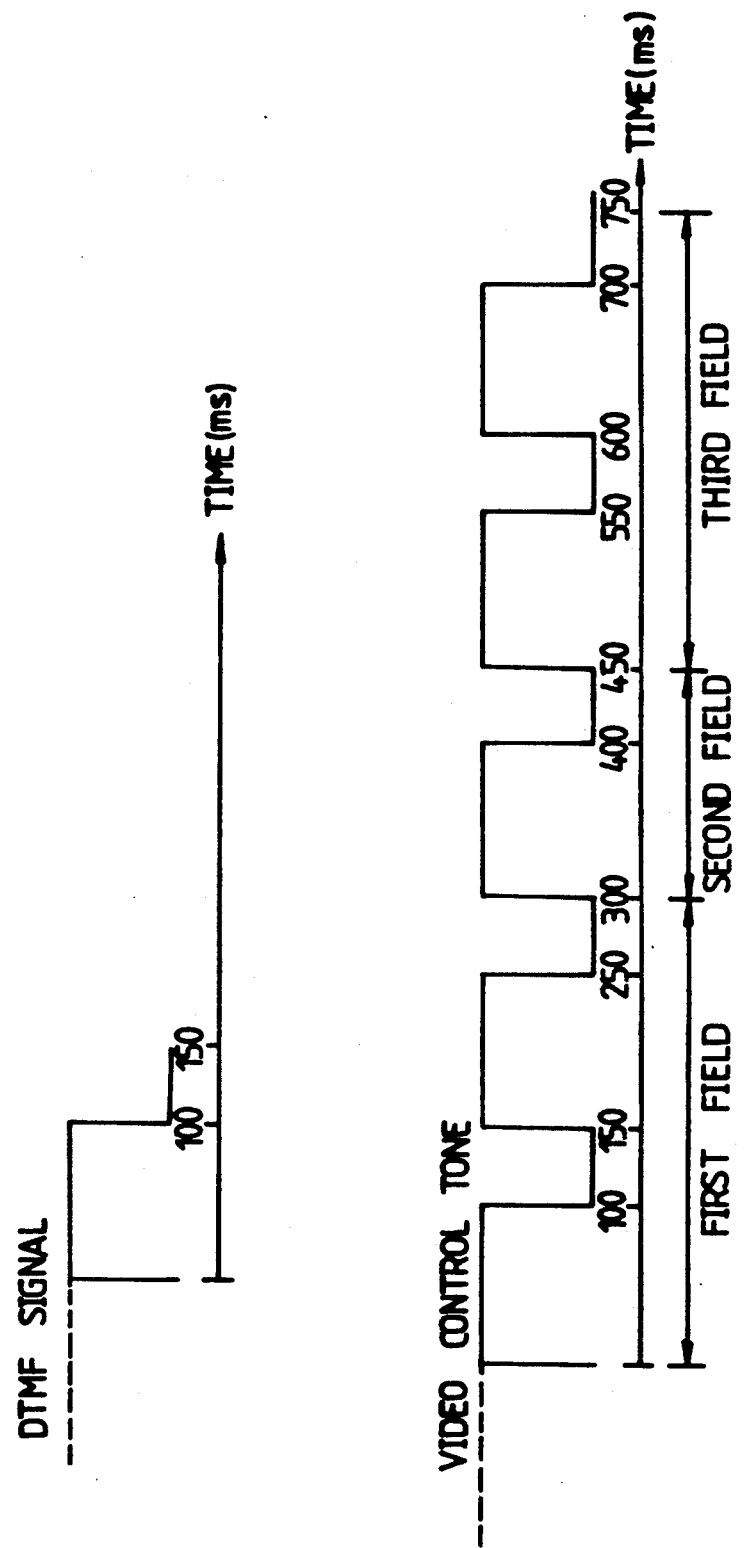
FIG. 2 is a timing diagram of video control tone of the present invention.
Figure 3:
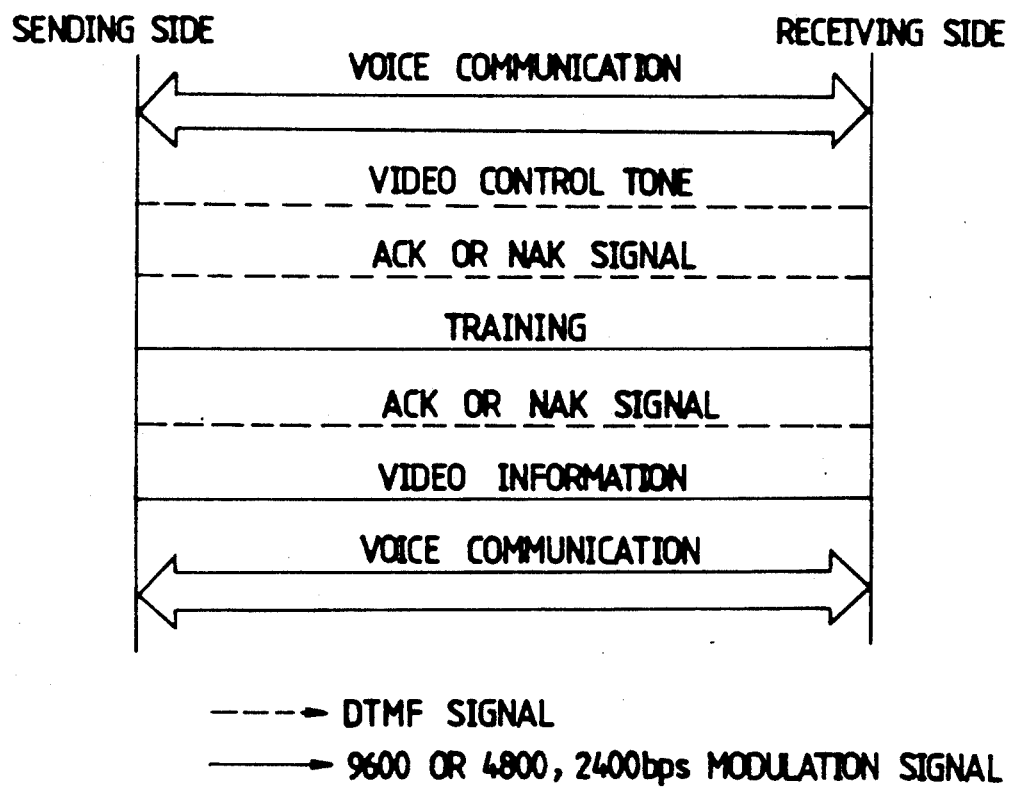
FIG. 3 is a schematic diagram showing control procedures of the preferred embodiment of the present invention.

FIG. 2 is a timing diagram of video control tone of the present invention. FIG. 3 is a schematic diagram showing control procedures of the preferred embodiment of the present invention.

The program in the ROM 4 performs the control procedures in FIG. 3 by using the DTMF signal in FIG. 2.

The receiver turns the voice communication mode into video data communication mode after transmitting a video control tone comprising three fields.

A first field, two consecutive DTMF signal, indicates the start of the video data communication, the communication recovery after deceleration of the transmission rate, following the NAK signal from the receiver in case the quality of the line is varified bad according to the training data, and the ACK or NAK signal of the receiver.

A second field indicates the transmission rate of the video data, such as 9,600 bps, 4,800 bps, 2,400 bps.

A third field indicates color of the video data—black and white or full color—transmitted, size of the video data, the inclusion of the character data, and the sort of the character data.

The third field is not used during the communication recovery following the deceleration of the transmission rate. And, both the second field and the third field are not used when ACK or NAK signal is generated. The transmission duration of the DTMF signal is 100 msec, and no-signal duration is 50 msec.

In FIG. 3, the terminal which received the video control tone should transmit ACK signal in 100 msec. And, the transmitter's side which received the ACK signal continuously trains the data, consecutive binary 0's. The receiver's side transmits NAK signal when error-bit count is over a specific level. If not, it transmits ACK signal.

The transmitter's side terminal which received ACK signal from the receiver's side turns into the voice communication mode after the transmission of the video data in predetermined transmission rate. If NAK signal is received, the first field is defined as two consecutive DTMF indicating the communication recovery by the deceleration of the transmission rate, and the second field is defined as two consecutive DTMF signal indicating the transmission rate after the deceleration. Then, the training starts again after delay of 100 msec.

Here, the transmission rate decelerates in the sequence of 9,600 bps, 4,800 bps, and 2,400 bps. When the transmission rate reaches 2,400 bps, the terminal turns into the voice communication mode without training after the transmission of the video data.

Figure 4:
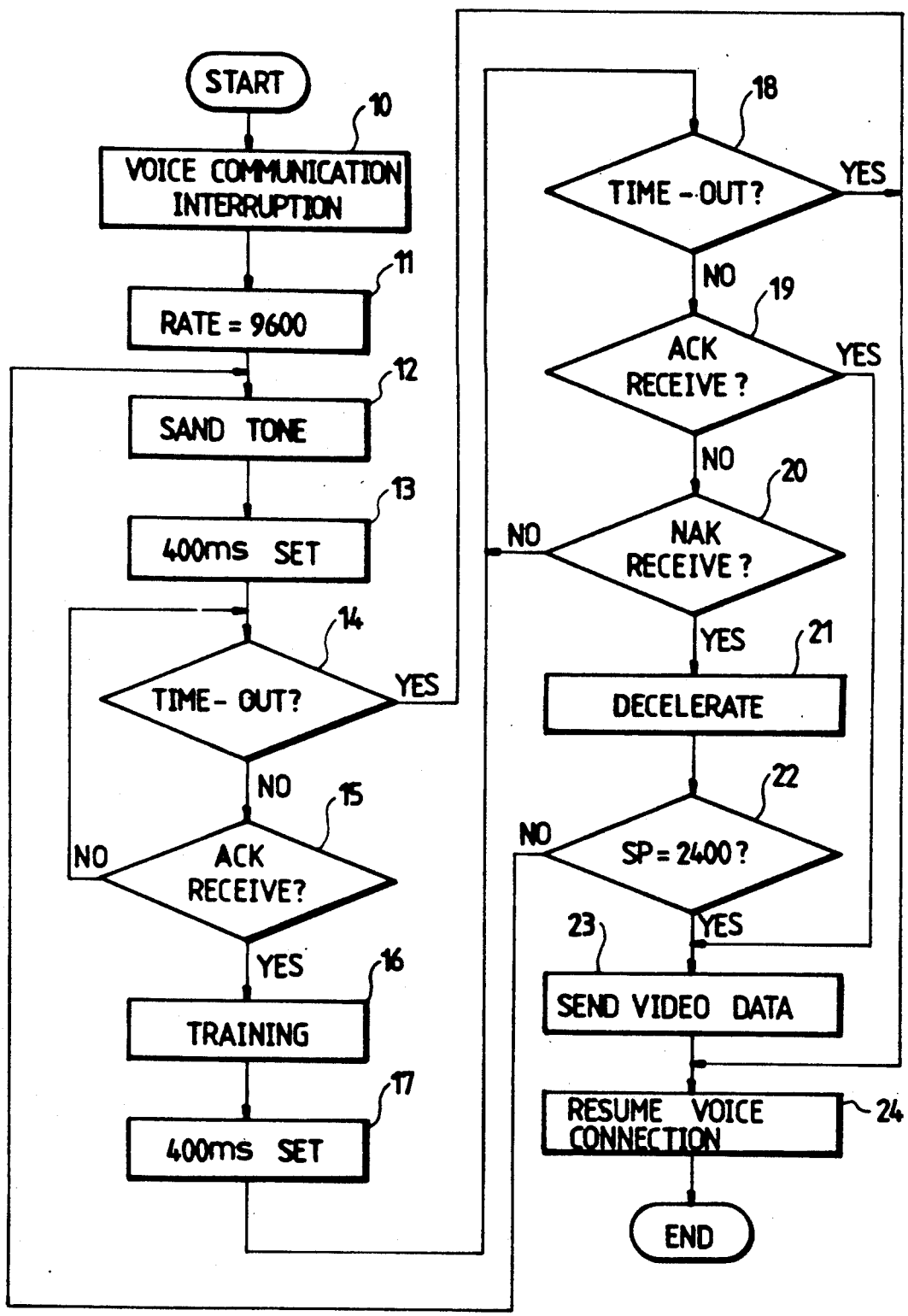
FIG. 4 is a flow chart of the receiver's side control procedure in FIG. 3.
Figure 5:
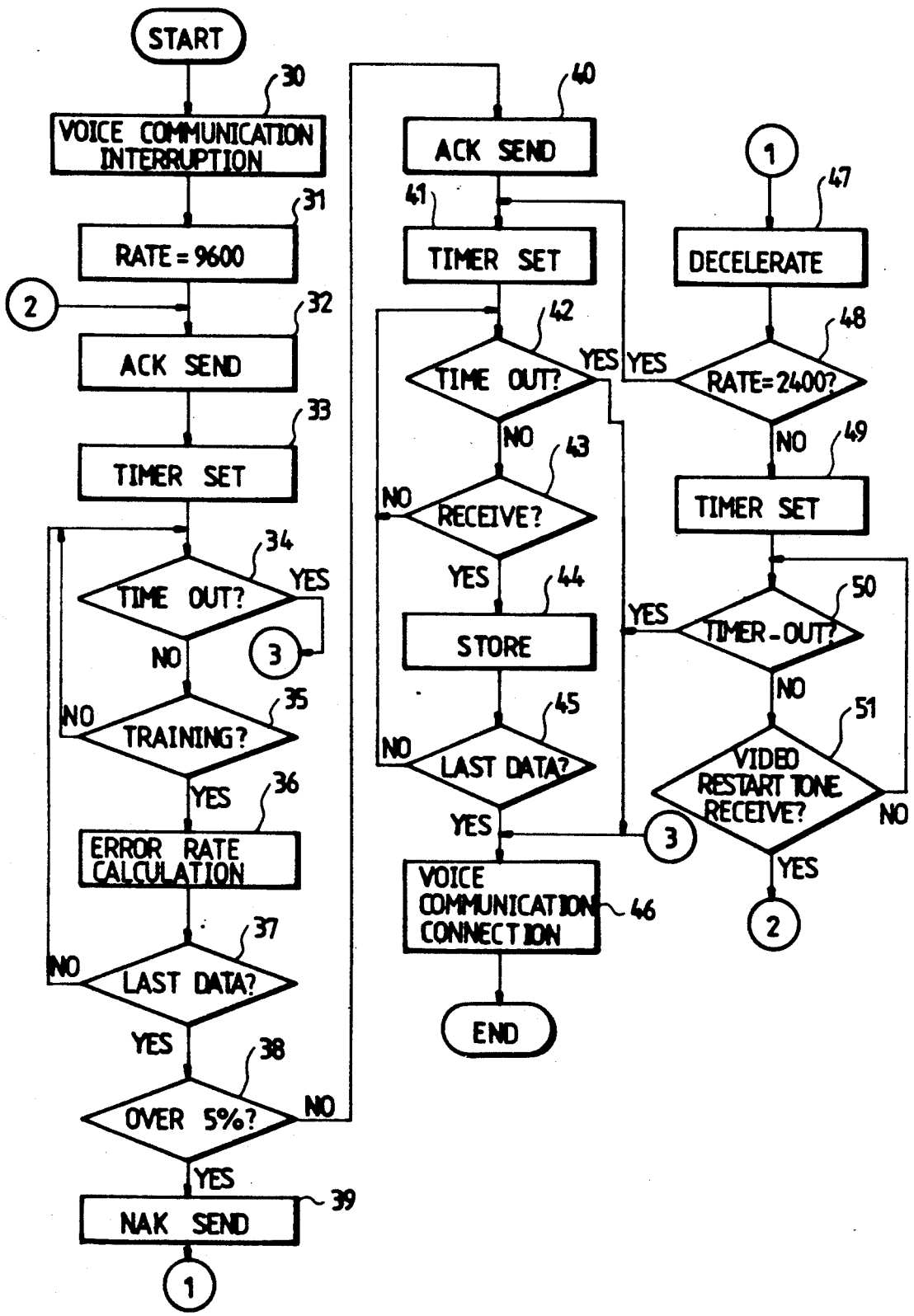
FIG. 5 is a flow chart of the transmitter's side control procedure in FIG. 4.

FIG. 4 is a flow chart of the receiver's side control procedure in FIG. 3. FIG. 5 is a flow chart of the transmitter's side control procedure in FIG. 4.

In FIG. 4, a video control tone is sent (12) in the rate of 9,600 bps (11), and the timer is set for 400 msec (13) after the voice communication interruption (10). In case ACK signal is received in time-out, training signal is sent, and the timer is set for 400 msec again. If ACK signal is received in time-out again, the video data is transmitted (14) through (19 and 23). When NAK signal is received instead of ACK signal (19 and 20), the transmission rate is decelerated to the rate of 2,400 bps (21 and 22), the voice communication mode is recovered (24) after the transmission of the video data (23).

In FIG. 5, ACK signal is sent (32), and the timer is set (33), when the video control tone of the transmission rate 9,600 bps after the voice communication interruption (30). In case the training is received in time-out (34 and 35), the error rate is calculated to the last data. If the error rate is over 5%, NAK signal is transmitted (36 through 39). If the error rate is below 5%, ACK signal is transmitted, and the timer is set (38, 40, and 41).

In case the video data is received in time-out (42 and 43), it is demodulated and stored in the video data memory to the last data. Then, the voice communication mode is recovered.

In case the deceleration of the transmission rate is proceeding (47), the procedure goes on into the timer setting (41) when the transmission rate is 2,400 bps. When the transmission rate is not 2,400 bps (48), the procedure jumps into the timer setting (49). And, in case the video restart tone is received in time-out (51), the procedure jumps into the ACK transmission step (32).

Also, when the video control tone transmission is completed or the training data transmission is completed on the transmitter's side, a timer of 400 msec is provided. In case the relevant reception signal is not received in time-out, the terminal turns into the voice communication mode after the video communication mode interruption. Likewise, when ACK or NAK signal transmission is completed in the response to the video control tone or the response signal transmission is completed in the response to the training data on the receiver's side, a timer of 2 sec or 8 sec through 30 sec is provided. In case the relevent data is not received, the terminal turns into the voice communication mode.

Since the present invention transmits the DTMF signal in the predefined digital sequence, the mode transition is assured, and the data about the transmission rate and the sort of the video data can be transmitted in short time. High resolution video data transmission of over 64 grey levels, which was hard to deal with in the conventional method, is possible as the video data are transmitted in digital transmission method. By varification of the quality of the line with the training, the transmission rate is adjusted according to the quality of the line. So, clear video data transmission is possible.

Especially, the fabrication of the system is easy for the modulation and demodulation method adopted is built in a popular one-chip device of facsimile. In consequence, the transmission rate can be improved as the transmission rate of facsimile is going to be sped up to 14,400 bps.

What is claimed is:

1. A method for sending and receiving freeze-frame video information, the method comprising:
   a first step for sending a video control tone signal consisting of five dual tone multifrequency (DTMF) signals for forming three fields comprising a first field of two DTMF tones which contains a signal indicating a start of video data communication, a retransmission signal after deceleration of a transmission speed, and a signal indicating the transmission of video data, a second field of a DTMF tone which indicates said transmission speed, and a third field of two DTMF tones which contains information regarding color of the video data, size of the video data, and type of a character data;
   a second step for receiving in one field among said three fields an Acknowledge ("ACK") signal or a Negative Acknowledge ("NAK") signal from a receiving side in response to said first step;
   a third step for sending a plurality of binary "0" signals according to the transmission speed of said second field when said ACK signal of said second step has been received; and a fourth step for sending the video data at the transmission speed when said ACK signal has been received in response to said third step, and for restarting from said first step after reducing the transmission speed sequentially from 9.6 kbps to 4.8 kbps and then to 2.4 kbps in case said NAK signal has been received after performing said third step.

* * * * *